United States Patent
Kim et al.

(10) Patent No.: US 11,815,964 B2
(45) Date of Patent: Nov. 14, 2023

(54) ANTENNA STRUCTURE AND DISPLAY DEVICE COMPRISING SAME

(71) Applicant: DONGWOO FINE-CHEM CO., LTD., Jeollabuk-do (KR)

(72) Inventors: Jong Min Kim, Gyeonggi-do (KR); Han Sub Ryu, Gyeongsangbuk-do (KR); Dong Pil Park, Incheon (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 547 days.

(21) Appl. No.: 17/154,266

(22) Filed: Jan. 21, 2021

(65) Prior Publication Data
US 2021/0141426 A1    May 13, 2021

Related U.S. Application Data

(63) Continuation of application No. PCT/KR2019/009004, filed on Jul. 22, 2019.

(30) Foreign Application Priority Data

Jul. 23, 2018  (KR) .......................... 10-2018-0085540

(51) Int. Cl.
*G06F 1/16*        (2006.01)
*G06F 1/18*        (2006.01)
(Continued)

(52) U.S. Cl.
CPC .......... *G06F 1/1698* (2013.01); *G06F 1/1626* (2013.01); *G06F 1/189* (2013.01);
(Continued)

(58) Field of Classification Search
CPC ...... G06F 1/1698; G06F 1/189; G06F 1/1626; H01Q 1/38; H01Q 1/364; H01Q 9/045; H01Q 1/22; H01Q 9/0485; H01Q 1/46
(Continued)

(56) References Cited

U.S. PATENT DOCUMENTS

2017/0250460 A1* 8/2017 Shin .................... H04M 1/0277
2017/0302771 A1* 10/2017 Kim ........................ H01Q 9/42

FOREIGN PATENT DOCUMENTS

CN    102782937 A    11/2012
CN    103729676 A     4/2014
(Continued)

OTHER PUBLICATIONS

International Search Report for PCT/KR2019/009004 dated Oct. 29, 2019.

*Primary Examiner* — Khai M Nguyen
(74) *Attorney, Agent, or Firm* — The PL Law Group, PLLC (57) ABSTRACT

An antenna structure of an embodiment of the present invention includes a film antenna including a dielectric layer and an antenna electrode layer formed on an upper surface of the dielectric layer, and a flexible circuit board including a power supply wiring electrically connected to the antenna electrode layer. A bonding region is defined by a region in which the antenna electrode layer and the power supply wiring are overlapped with each other in a planar direction, and the bonding region has a length of 1.5 mm or less. Signal efficiency and radiation reliability may be improved by adjusting a length of the bonding region.

18 Claims, 4 Drawing Sheets

(51) Int. Cl.
    *H01Q 1/38*      (2006.01)
    *H01Q 1/36*      (2006.01)
    *H01Q 1/22*      (2006.01)
    *H01Q 9/04*      (2006.01)
    *H01Q 1/46*      (2006.01)

(52) U.S. Cl.
    CPC ............... *H01Q 1/22* (2013.01); *H01Q 1/364* (2013.01); *H01Q 1/38* (2013.01); *H01Q 1/46* (2013.01); *H01Q 9/045* (2013.01); *H01Q 9/0485* (2013.01)

(58) Field of Classification Search
    USPC ..................................................... 343/700 R
    See application file for complete search history.

(56) References Cited

FOREIGN PATENT DOCUMENTS

| | | |
|---|---|---|
| CN | 105742797 A | 7/2016 |
| JP | 2004-032547 A | 1/2004 |
| JP | 2007-089109 A | 4/2007 |
| JP | 2017-175540 A | 9/2017 |
| KR | 10-2008-0100699 A | 11/2008 |
| KR | 10-2013-0095451 A | 8/2013 |
| KR | 10-1326111 B1 | 11/2013 |
| KR | 10-2015-0101281 A | 9/2015 |
| KR | 10-1595026 B1 | 2/2016 |
| KR | 10-2016-0135453 A | 11/2016 |
| KR | 10-1744886 B1 | 6/2017 |
| KR | 10-2017-0100749 A | 9/2017 |
| KR | 10-2018-0023278 A | 3/2018 |
| WO | WO 2015/112008 A2 | 7/2015 |

\* cited by examiner

ANTENNA STRUCTURE AND DISPLAY DEVICE COMPRISING SAME

CROSS REFERENCE TO RELATED APPLICATIONS AND CLAIM OF PRIORITY

The present application is a continuation application to International Application No. PCT/KR2019/009004 with an International Filing Date of Jul. 22, 2019, which claims the benefit of Korean Patent Application No. 10-2018-0085540 filed on Jul. 23, 2018 at the Korean Intellectual Property Office, the disclosures of which are incorporated by reference herein in their entirety.

TECHNICAL FIELD

The present invention relates to an antenna structure and a display device including the same, and more particularly, to an antenna structure including electrodes and a dielectric layer, and a display device including the same.

BACKGROUND ART

Recently, according to development of the information-oriented society, wireless communication techniques such as Wi-Fi, Bluetooth, and the like are implemented, for example, in a form of smartphones by combining with display devices. In this case, an antenna may be coupled to the display device to perform a communication function.

Recently, with mobile communication techniques becoming more advanced, it is necessary for an antenna for performing communication in high frequency or ultra high frequency bands to be coupled to the display device.

In addition, as the display device on which the antenna is mounted becomes thinner and lighter, a space occupied by the antenna may also be reduced. Accordingly, it is not easy to simultaneously implement the transmission and reception of high frequency or ultra high frequency and wideband signals within a limited space.

Therefore, it is necessary to develop an antenna which is inserted into the thin display device in a form of a film or a patch, and secures reliability of radiation characteristics despite the thin structure.

For example, when supplying power to the antenna from a circuit structure, unintended radiation may occur from a wire through which the power is distributed. Thereby, noise may occur, and radiation efficiency of the antenna may be decreased.

SUMMARY

An object of the present invention is to provide an antenna structure having improved signal efficiency and reliability.

Another object of the present invention is to provide a display device including the antenna structure having the improved signal efficiency and reliability.

To achieve the above objects, the following technical solutions are adopted in the present invention.

1. An antenna structure including: a film antenna including a dielectric layer and an antenna electrode layer formed on an upper surface of the dielectric layer; and a flexible circuit board including a power supply wiring electrically connected to the antenna electrode layer,
wherein a bonding region is defined by a region in which the antenna electrode layer and the power supply wiring are overlapped with each other in a planar direction, and the bonding region has a length of 1.5 mm or less.

2. The antenna structure according to the above 1, wherein the bonding region has a length of 1.1 mm or less.

3. The antenna structure according to the above 1, wherein the bonding region has a length of 50 µm to 0.7 mm.

4. The antenna structure according to the above 1, wherein the antenna electrode layer includes a radiation pattern and a signal pad electrically connected to the radiation pattern, and
the power supply wiring is electrically connected to the signal pad.

5. The antenna structure according to the above 4, wherein the power supply wiring and the signal pad have the same bonding width as each other.

6. The antenna structure according to the above 5, further including a conductive relay structure disposed between the power supply wiring and the signal pad,
wherein the conductive relay structure has the same bonding width as that of the power supply wiring and the signal pad.

7. The antenna structure according to the above 1, wherein the flexible circuit board further includes a core layer and a power supply ground disposed on the upper surface of the core layer,
wherein the power supply wiring is disposed on a lower surface of the core layer.

8. The antenna structure according to the above 7, wherein the antenna electrode layer includes a radiation pattern, a signal pad electrically connected to the radiation pattern, and ground pads disposed around the signal pad, and the power supply ground is electrically connected with the ground pads.

9. The antenna structure according to the above 1, wherein the flexible circuit board is disposed on the antenna electrode layer of the film antenna.

10. The antenna structure according to the above 1, wherein the flexible circuit board is disposed below a lower surface of the dielectric layer of the film antenna.

11. The antenna structure according to the above 10, wherein the film antenna further includes an antenna ground layer disposed on the lower surface of the dielectric layer.

12. The antenna structure according to the above 10, wherein the antenna electrode layer is bent and extends on the lower surface of the dielectric layer.

13. The antenna structure according to the above 12, wherein the flexible circuit board further includes a power supply contact which electrically connects the antenna electrode layer and the power supply wiring.

14. The antenna structure according to the above 1, further including a circuit structure disposed on the flexible circuit board to supply power to the antenna electrode layer through the power supply wiring.

15. The antenna structure according to the above 14, wherein the antenna structure is driven at a frequency of 20 to 30 GHz, and is supplied with power corresponding to a range of 40 to 70Ω through the circuit structure.

16. The antenna structure according to the above 1, wherein the antenna electrode layer includes a mesh structure.

17. The antenna structure according to the above 16, wherein the film antenna further includes a dummy mesh layer disposed around the antenna electrode layer.

18. A display device including the antenna structure according to any one of the above 1 to 17.

In the antenna structures according to the embodiments of the present invention, the bonding length of the antenna electrode layer connected to the power supply wiring of the flexible circuit board may be adjusted within a predetermined range. In addition, the bonding widths of the power supply wiring and the antenna electrode layer may be formed to be substantially the same as each other. Accordingly, impedance matching in the bonding region of the antenna electrode layer and the power supply wiring may be improved, and self-radiation at the power supply wiring may be suppressed. Therefore, for example, it is possible to improve efficiency and reliability of supplying a signal from a circuit structure to the antenna electrode.

In some embodiments, the flexible circuit board may further include a power supply ground disposed on an upper surface of the power supply wiring. Accordingly, it is possible to further shield or reduce the self-radiation which may occur in the power supply wiring.

In some embodiments, by forming at least a part of the antenna electrode layer in a mesh structure, transmittance of the antenna structure may be improved. For example, the antenna structure may be applied to a display device including a mobile communication device capable of transmitting and receiving signals in a high frequency or ultra high frequency band of 3G, 4G, 5G or higher, and thereby improving optical characteristics such as radiation characteristics and transmittance.

DETAILED DESCRIPTION

Embodiments of the present invention provide an antenna structure which includes a flexible circuit board including a dielectric layer, an antenna electrode, and a power supply wiring layer electrically connected to the antenna electrode, and has improved radiation reliability by adjusting a length of a bonding region in which the power supply wiring layer and the antenna electrode are connected with each other. The antenna structure may be, for example, a microstrip patch antenna manufactured in a form of a transparent film. The antenna structure may be applied to a communication device for 3G, 4G, or 5G mobile communication, for example.

Further, embodiments of the present invention provide a display device including the antenna structure.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

In the following drawings, for example, two directions which are parallel to an upper surface of a dielectric layer 110 and cross each other are defined as a first direction and a second direction. For example, the first direction and the second direction may cross perpendicular to each other. A direction perpendicular to the upper surface of the dielectric layer 110 is defined as a third direction. For example, the first direction may correspond to a length direction of the antenna structure, the second direction may correspond to a width direction of the antenna structure, and the third direction may correspond to a thickness direction of the antenna structure. The definition of the directions may be equally applied to all the drawings.

Figure 1:
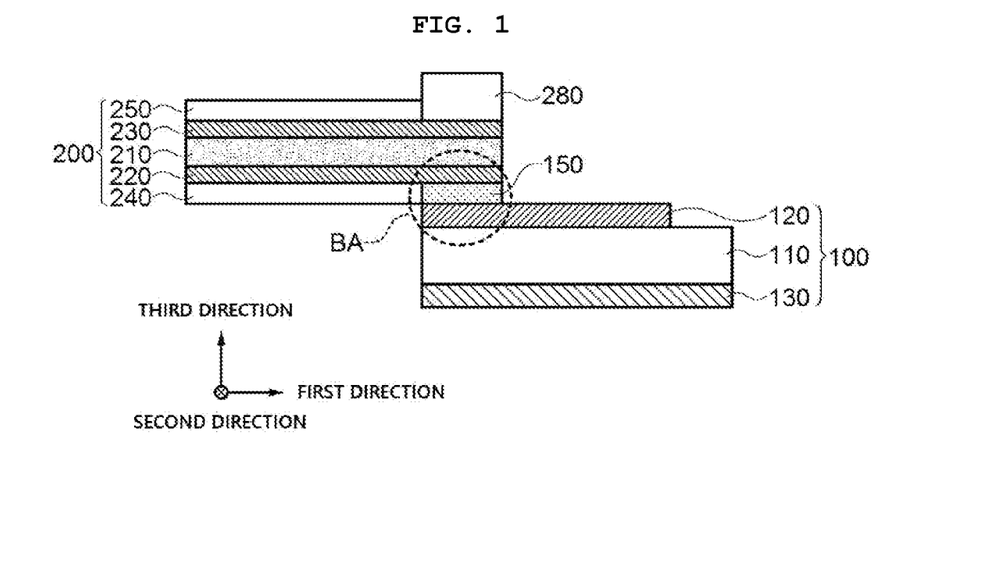
FIG. 1 is a schematic cross-sectional view illustrating an antenna structure according to exemplary embodiments.

FIG. 1 is a schematic cross-sectional view illustrating the antenna structure according to exemplary embodiments.

Referring to FIG. 1, the antenna structure may include a film antenna 100 and a flexible printed circuit board (FPCB) (briefly referred to as a flexible circuit board) 200. The antenna structure may further include a circuit structure electrically connected to the film antenna 100 through the flexible circuit board 200.

The film antenna 100 may include a dielectric layer 110 and an antenna electrode layer 120 disposed on an upper surface of the dielectric layer 110. In some embodiments, an antenna ground layer 130 may be disposed on a lower surface of the dielectric layer 110.

The dielectric layer 110 may include, for example, a transparent resin material. For example, the dielectric layer 110 may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acryl resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; a polyimide resin such as nylon, aromatic polyimide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; an epoxy resin; a urethane or acrylic urethane resin, a silicone resin and the like. These may be used alone or in combination of two or more thereof.

In some embodiments, an adhesive film such as an optically clear adhesive (OCA), an optically clear resin (OCR), and the like may also be included in the dielectric layer 110.

In some embodiments, the dielectric layer 110 may include an inorganic insulation material such as silicon oxide, silicon nitride, silicon oxynitride, glass and the like.

In one embodiment, the dielectric layer 110 may be provided in a substantially single layer. In one embodiment, the dielectric layer 110 may also include a multilayer structure of two or more layers.

Capacitance or inductance may be generated between the antenna electrode layer 120 and the antenna ground layer 130 by the dielectric layer 110, thus to adjust a frequency band which can be driven or sensed by the film antenna. In some embodiments, a dielectric constant of the dielectric layer 110 may be adjusted in a range of about 1.5 to 12.

When the dielectric constant exceeds about 12, a driving frequency is excessively reduced, such that driving of the antenna in a desired high frequency band may not be implemented.

The antenna electrode layer 120 may include a radiation pattern of the film antenna 100. According to exemplary embodiments, the antenna electrode layer 120 may further include a transmission line and pad electrodes, and the pad electrodes and the radiation pattern may be electrically connected with each other by the transmission line. The pad electrodes may include a signal pad and ground pads. The configuration and structure of the antenna electrode layer 120 will be described in more detail below with reference to FIG. 2.

The antenna ground layer 130 may be disposed on the lower surface of the dielectric layer 110. In some embodiments, the antenna ground layer 130 may be disposed so as to be entirely overlapped with the antenna electrode layer 120 in a planar direction.

The antenna electrode layer 120 and the antenna ground layer 130 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy including at least one thereof. These may be used alone or in combination of two or more thereof.

For example, the antenna electrode layer 120 and the antenna ground layer 130 may include silver (Ag) or a silver alloy to implement low resistance. For example, it is possible to include a silver-palladium-copper (APC) alloy.

In an embodiment, the antenna electrode layer 120 and the antenna ground layer 130 may include copper (Cu) or a copper alloy to implement a low resistance and fine line width pattern. For example, the antenna electrode layer 120 and the antenna ground layer 130 may include a copper-calcium (Cu—Ca) alloy.

In some embodiments, the antenna electrode layer 120 and the antenna ground layer 130 may include a transparent conductive oxide such as indium tin oxide (ITO), indium zinc oxide (IZO), indium zinc tin oxide (IZTO), or zinc oxide (ZnOx).

For example, the antenna electrode layer 120 may have a three-layer structure of a transparent conductive oxide layer-metal layer-transparent conductive oxide layer. In this case, resistance may be reduced while improving flexible properties by the metal layer, and corrosion resistance and transparency may be improved by the transparent conductive oxide layer.

The flexible circuit board 200 may be disposed on the antenna electrode layer 120 so as to be electrically connected with the film antenna 100. The flexible circuit board 200 may include a core layer 210, a power supply wiring 220, and a power supply ground 230. An upper coverlay film 250 and a lower coverlay film 240 for protecting wirings may be formed on upper and lower surfaces of the core layer 210, respectively.

The core layer 210 may include a resin material having flexibility, such as polyimide, epoxy resin, polyester, cyclo olefin polymer (COP), liquid crystal polymer (LCP) and the like.

The power supply wiring 220 may be disposed on a lower surface of the core layer 210, for example. The power supply wiring 220 may be provided as a wiring for distributing power from a circuit structure 280 to the antenna electrode layer 120.

According to exemplary embodiments, the power supply wiring 220 may be electrically connected with the antenna electrode layer 120 (e.g., a signal pad 126 shown in FIG. 2) through a conductive relay structure 150.

The conductive relay structure 150 may be made of, for example, an anisotropic conductive film (ACF). In this case, the conductive relay structure 150 may include conductive particles (e.g., silver particles, copper particles, carbon particles, etc.) dispersed in the resin layer.

As shown in FIG. 1, a bonding region BA may be defined by a region in which the antenna electrode layer 120, the conductive relay structure 150, and the power supply wiring 220 are sequentially contacted or laminated in the third direction.

For example, by partially cutting or removing the lower coverlay film 240, a portion of the power supply wiring 220 having a size corresponding to the bonding region BA may be exposed. A bonding structure in the bonding region BA may be implemented by press bonding the exposed portion of the power supply wiring 220 and the antenna electrode layer 120 to each other through the conductive relay structure 150.

The power supply ground 230 may be disposed on the upper surface of the core layer 210. The power supply ground 230 may have a line shape or a plate shape. The power supply ground 230 may function as a barrier for shielding or suppressing noise or self-radiation generated from the power supply wiring 220.

The power supply wiring 220 and the power supply ground 230 may include the metal and/or alloy described in the antenna electrode layer 120.

In some embodiments, the power supply ground 230 may be electrically connected with the ground pads 123 and 125 (see FIG. 2) of the antenna electrode layer 120 through ground contacts (not illustrated) which penetrates the core layer 210.

The circuit structure 280 may be disposed on the flexible circuit board 200. For example, the circuit structure 280 may include a connector which electrically connects the flexible circuit board 200 with another circuit board (e.g., a main board of an image display device) or an integrated circuit chip for driving the antenna which is directly mounted on the flexible circuit board 200.

Power may be supplied from the circuit structure 280 to the antenna electrode layer 120 through the power supply wiring 220. For example, the flexible circuit board 200 may further include a circuit or contact for electrically connecting the circuit structure 280 and the power supply wiring 220.

Figure 2:
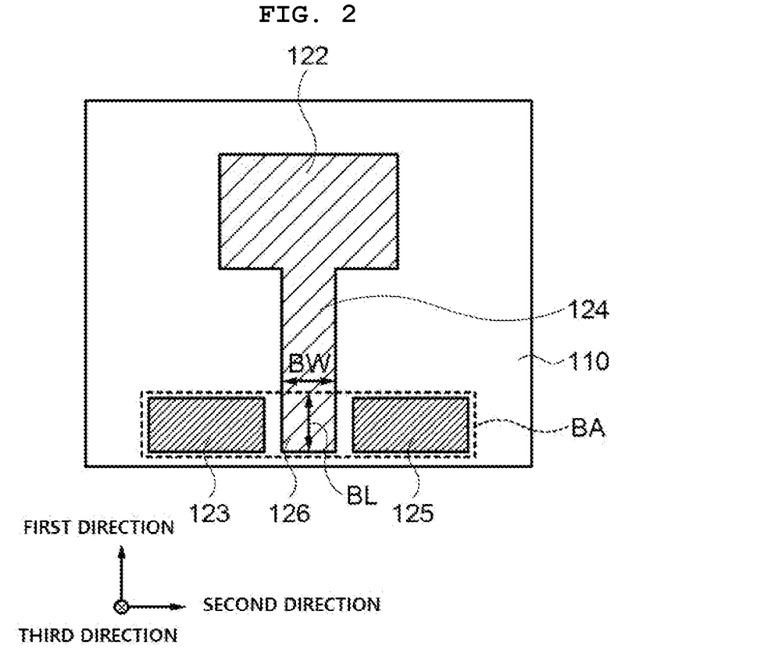
FIG. 2 is a schematic plan view illustrating an antenna electrode layer structure of the antenna structure according to exemplary embodiments.
Figure 3:
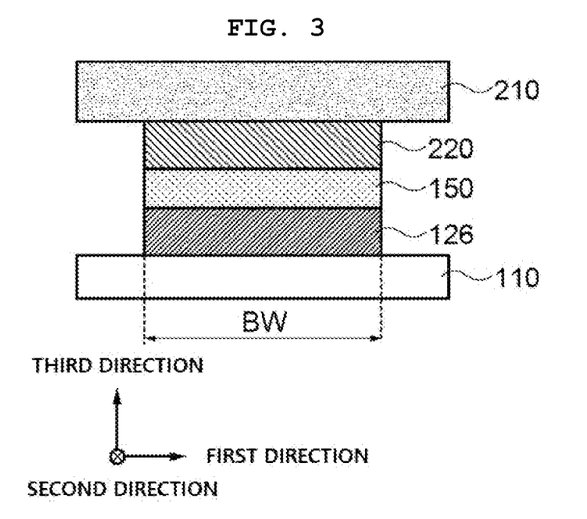
FIG. 3 is a partially enlarged cross-sectional view illustrating a connection between a power supply wiring and an antenna electrode layer in a bonding region according to some embodiments.

FIG. 2 is a schematic plan view illustrating the antenna electrode layer structure of the antenna structure according to exemplary embodiments. FIG. 3 is a partially enlarged cross-sectional view illustrating a connection of the power supply wiring and the antenna electrode layer in the bonding region.

Referring to FIG. 2, as described above, the antenna electrode layer 120 shown in FIG. 1 may include a radiation pattern 122, a transmission line 124, and the pad electrodes. The pad electrodes may include a signal pad 126 and ground pads 123 and 125.

The transmission line 124 may branch to the radiation pattern 122 and extend in the first direction. In one embodiment, the transmission line 124 may be substantially integrally connected with the radiation pattern 122 to be provided as a single member.

In some embodiments, an end portion of the transmission line 124 may be provided as the signal pad 126. The ground pads may include a first ground pad 123 and a second ground pad 125. The first ground pad 123 and the second ground pad 125 may be disposed to face each other in the second direction with the signal pad 126 interposed therebetween.

A region which covers the signal pad 126 and the ground pads 123 and 125 in the planar direction may be provided as the bonding region BA shown and described in FIG. 1, in which the connection with the flexible circuit board 200 is performed.

In some embodiments, the power supply wiring 220 of the flexible circuit board 200 may be selectively connected with the signal pad 126, and in this case, the bonding region BA may be defined as a region which covers the signal pad 126 in FIG. 2.

A length of the bonding region (hereinafter may be abbreviated as a bonding length BL) may be substantially the same as a length (a length in the first direction) of the power supply wiring 220 connected with the signal pad 126. In addition, the bonding length BL may be substantially the same as the length of the signal pad 126.

A width of the bonding region (hereinafter, may be abbreviated as a bonding width BW) may be substantially the same as a width (a width in the second direction) of a portion of the power supply wiring 220 connected with the signal pad 126. In addition, the bonding width BW may be substantially the same as a width of the signal pad 126.

According to exemplary embodiments, the bonding length BL may be about 1.5 mm or less. Within the above range, impedance matching between the power supply wiring 220 and the signal pad 126 may be substantially implemented.

For example, when performing high-frequency communication in a range of about 20 GHz to 30 GHz, resistance or impedance may be set to about 40 to 70Ω, preferably about 50 to 60Ω, and more preferably around 50Ω for resonance without signal reflection through the circuit structure 280.

In this case, it is also necessary for the power supply wiring 220 and the signal pad 126 to implement impedance matching within the above range. If the impedance matching is not implemented, radiation may be generated by the power supply wiring 220 itself, such that signal loss may occur, and signal efficiency to the antenna electrode layer 120 may be decreased.

In addition, when a relay structure made of a different material such as the conductive relay structure 150 is inserted, a more precise design of the bonding region BA may be required for the impedance matching.

According to exemplary embodiments, by limiting the bonding length BL to about 1.5 mm or less, signal reflection or self-radiation from the power supply wiring 220 may be eliminated or significantly reduced.

In one embodiment, the bonding length BL may be about 1.1 mm or less. In a preferred embodiment, the bonding length BL may be about 0.7 mm or less. In addition, the bonding length BL may be about 50 μm or more in order to implement a substantial electrical connection.

FIG. 3 is a partially enlarged cross-sectional view illustrating a connection between the power supply wiring layer and the antenna electrode layer in the bonding region according to some embodiments.

Referring to FIG. 3, the signal pad 126, the conductive relay structure 150, and the power supply wiring 220 may sequentially contact or be laminated in the bonding region BA to define the bonding structure.

The power supply wiring 220 and the conductive relay structure 150 may have substantially the same width as the signal pad 126. Accordingly, the bonding structure including the signal pad 126, the conductive relay structure 150, and the power supply wiring 220 may have a single pattern shape having the bonding width BW.

The expression "substantially the same width" as used herein should be understood as a meaning of allowing a process error or alignment error. For example, the substantially the same width may include a range of about 70 to 130%, preferably about 80 to 120%, and more preferably about 90 to 110% of the width of the signal pad 126 or the bonding width BW.

By matching the widths of the power supply wiring 220 and the conductive relay structure 150 to the bonding width BW, the impedance matching secured through an adjustment of the above-described bonding length BL may be more easily implemented or maintained for a long time.

In some embodiments, the power supply ground 230 may be overlapped with the ground pads 123 and 125 while having substantially the same width as each other. For example, the width of the power supply ground 230 may range from about 70 to 130%, preferably about 80 to 120%, and more preferably about 90 to 110% of the width of the ground pads 123 and 125.

Figure 4:
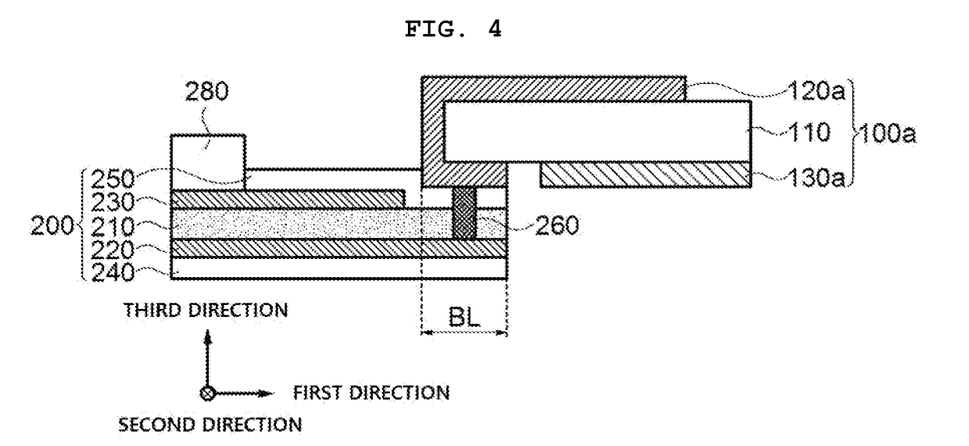
FIG. 4 is a schematic cross-sectional view illustrating an antenna structure according to some exemplary embodiments.

FIG. 4 is a schematic cross-sectional view illustrating an antenna structure according to some exemplary embodiments.

Referring to FIG. 4, a flexible circuit board 200 may be disposed below a film antenna 100a. For example, the flexible circuit board 200 may be combined with the film antenna 100a as a lower layer of a dielectric layer 110.

In this case, as shown in FIG. 4, a power supply wiring 220 may be electrically connected with an antenna electrode layer 120a through a power supply contact 260. In some embodiments, the antenna electrode layer 120a may be bent along a side wall of the dielectric layer 110 to extend onto a lower surface of the dielectric layer 110. For example, the signal pad of the antenna electrode layer 120a may extend onto the lower surface of the dielectric layer 110, and thus, the connection with the power supply wiring 220 through the power supply contact 260 may be easily implemented.

A bonding region is defined by a region in which the antenna electrode layer 120a and the power supply wiring 220 are overlapped with each other in a direction of the lower surface of the dielectric layer 110, and the bonding length BL may be defined as shown in FIG. 4. The bonding length BL may be adjusted to about 1.5 mm or less, preferably 1.1 mm or less, and more preferably 0.7 mm or less as described above.

Although not illustrated in detail in FIG. 4, a ground pad of the antenna electrode layer 120a is also bent along the side face of the dielectric layer 110 to extend to the lower surface of the dielectric layer 110, and may be electrically connected with the power supply ground 230 of the flexible circuit board 200. In an embodiment, a portion of the ground pad extending to the lower surface of the dielectric layer 110 may be integrally connected with an antenna ground layer 130a.

Figure 5:
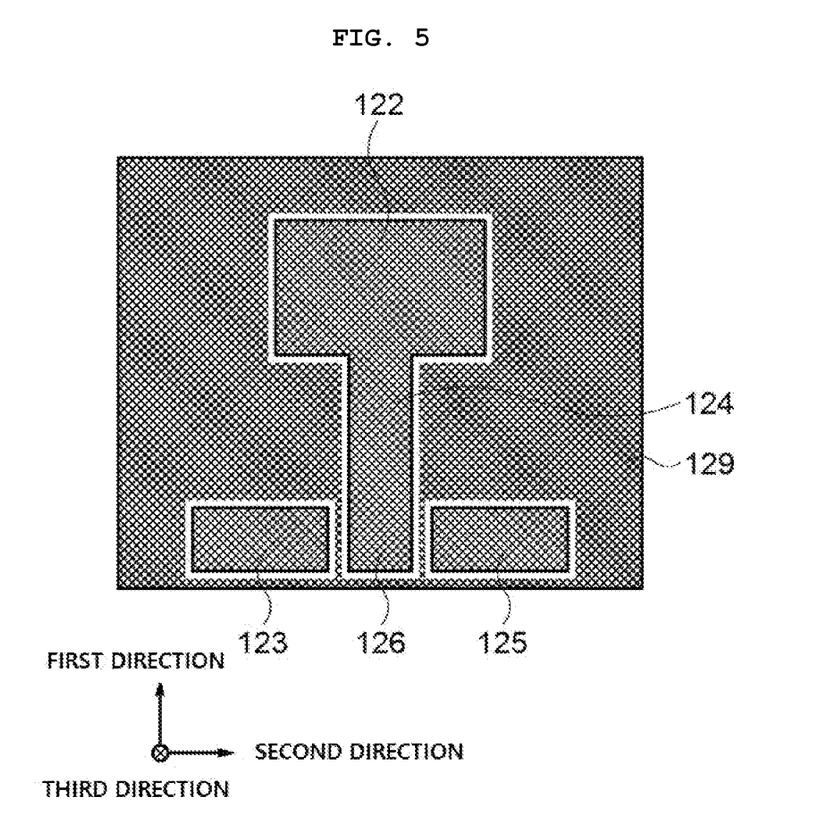
FIG. 5 is a schematic plan view illustrating a structure of an antenna electrode layer of the antenna structure according to some exemplary embodiments.

FIG. 5 is a schematic plan view illustrating a structure of the antenna electrode layer of the antenna structure according to some exemplary embodiments.

Referring to FIG. 5, the antenna electrode layer 120 may include a mesh structure. As shown in FIG. 5, all of a radiation pattern 122, a transmission line 124, a signal pad 126, and ground pads 123 and 125 may also include a mesh structure.

In some embodiments, the signal pad 126 and the ground pads 123 and 125 may be formed in a solid pattern in order to prevent signal loss due to an increase in the resistance.

As the antenna electrode layer 120 includes the mesh structure, transmittance of the film antenna 100 may be improved. In some embodiments, a dummy mesh layer 129 may be disposed around the antenna electrode layer 120. Electrodes around the antenna electrode layer 120 (e.g., around the radiation pattern 122) may be uniformly arranged by the dummy mesh layer 129 to prevent the mesh structure or electrode lines included therein from being viewed by a user of a display device.

For example, a mesh metal layer is formed on the dielectric layer 110, and the mesh metal layer is cut along a predetermined region to allow the dummy mesh layer 129 to be electrically and physically spaced apart from the radiation pattern 122, the transmission line 124 and the like.

For example, at least one of the radiation pattern 122, the transmission line 124, the signal pad 126, the ground pads 123 and 125, and the dummy mesh layer 129 may not include an outermost boundary line (e.g., an outermost boundary electrode line) at an edge portion (not illustrated). The edge portion may mean an outermost portion of each of the components, for example.

In some embodiments, the radiation pattern 122, the transmission line 124, the signal pad 126, the ground pads 123 and 125, and the dummy mesh layer 129 may include the outermost boundary line at the edge portion, respectively.

Figure 6:
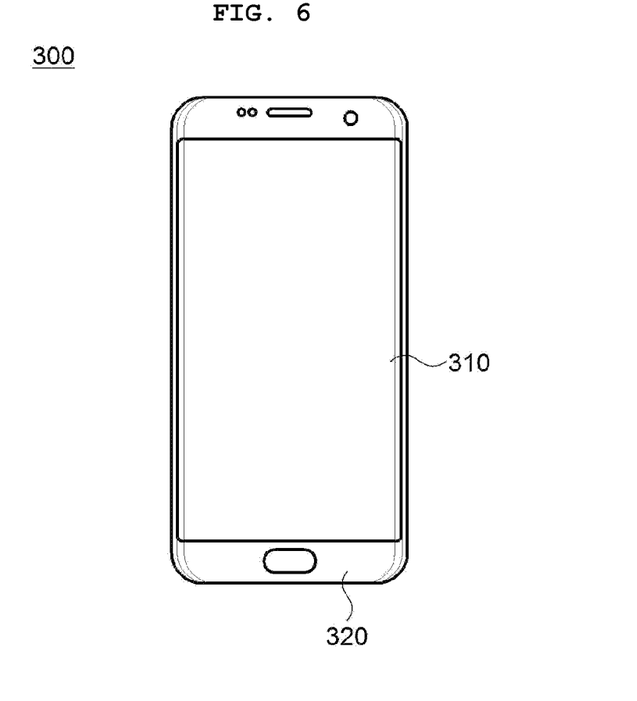
FIG. 6 is a schematic plan view illustrating a display device according to exemplary embodiments.

FIG. 6 is a schematic plan view illustrating a display device according to exemplary embodiments. For example, FIG. 6 illustrates an external shape including a window of the display device.

Referring to FIG. 6, a display device 300 may include a display region 310 and a peripheral region 320. The peripheral region 320 may be disposed on both sides and/or both ends of the display region 310, for example.

In some embodiments, the film antenna 100 included in the above-described antenna structure may be inserted into the peripheral region 320 of the display device 300 in a form of a patch. In some embodiments, the pad electrodes 123, 125, and 126 of the film antenna 100 may be disposed so as to correspond to the peripheral region 320 of the display device 300.

The peripheral region 320 may correspond to a light-shielding part or a bezel part of the image display device, for example. According to exemplary embodiments, the flexible circuit board 200 of the antenna structure may be disposed in the peripheral region 320 to prevent degradation of images in the display region 310 of the display device 300.

Further, the circuit structure 280 may be disposed on the flexible circuit board 200 together in the peripheral region 320. By arranging the pad electrodes 123, 125, and 126 of the film antenna so as to be adjacent to the flexible circuit board 200 and the circuit structure 280 within the peripheral region 320, signal loss may be suppressed by shortening a path for transmitting and receiving signals.

The radiation patterns 122 of the film antenna 100 may be at least partially overlapped with the display region 310. For example, as shown in FIG. 5, it is possible to reduce the radiation pattern 122 from being viewed by the user by utilizing the mesh structure.

Hereinafter, preferred examples are proposed to more concretely describe the present invention. However, the following examples are only given for illustrating the present invention and those skilled in the art will obviously understand that various alterations and modifications are possible within the scope and spirit of the present invention. Such alterations and modifications are duly included in the appended claims.

Experimental Example: Measurement of S11 Depending on a Change in Length of the Bonding Region A signal pad including a silver-palladium-copper alloy (APC) and having a bonding width BW of 250 μm was formed on a polyimide dielectric layer. An ACF layer was formed on the signal pad with the same bonding width as the dielectric layer, and a copper power supply wiring of a flexible circuit board was exposed and bonded to each other.

S-parameters (S11) were extracted while changing the bonding length at a frequency of about 26 GHz using a network analyzer with an impedance of 50Ω for a flexible circuit board-signal pad connection structure. Simulation results are obtained as a graph of FIG. 7. In the graph of S11, as the depth of the peak is increased, the radiation efficiency of the antenna is increased and the impedance matching is good.

Figure 7:
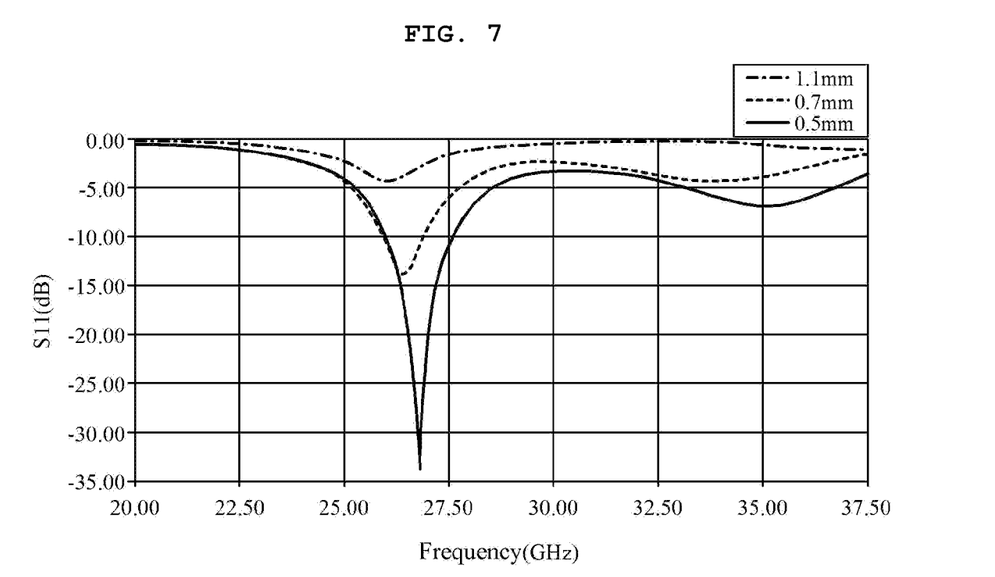
FIG. 7 is a graph illustrating a change in an S parameter depending on a change in a length of the bonding region of the antenna structure according to exemplary embodiments.

Referring to FIG. 7, the resonance frequency was substantially observed at a bonding length of about 1.1 mm, and the resonance frequency was clearly observed as the bonding length is decreased to 0.7 mm.

Specifically, in FIG. 7, the resonance frequency and S11 value depending on each bonding length are as shown in Table 1 below.

TABLE 1

| Bonding length (mm) | Resonance frequency (GHz) | S11 (dB) | Gain (dB) |
| --- | --- | --- | --- |
| 0.5 | 26.8 | −33.7 | +4.5 |
| 0.7 | 26.4 | −14.0 | +3.9 |
| 1.1 | 25.9 | −4.2 | +0.8 |

What is claimed is:

1. An antenna structure comprising:
   a film antenna comprising a dielectric layer and an antenna electrode layer formed on an upper surface of the dielectric layer; and
   a flexible circuit board comprising a power supply wiring electrically connected to the antenna electrode layer,
   wherein a bonding region is defined by a region in which the antenna electrode layer and the power supply wiring are overlapped with each other in a planar direction, and the bonding region has a length of 1.5 mm or less.

2. The antenna structure according to claim 1, wherein the bonding region has a length of 1.1 mm or less.

3. The antenna structure according to claim 1, wherein the bonding region has a length of 50 μm to 0.7 mm.

4. The antenna structure according to claim 1, wherein the antenna electrode layer comprises a radiation pattern and a signal pad electrically connected to the radiation pattern, and
   the power supply wiring is electrically connected to the signal pad.

5. The antenna structure according to claim 4, wherein the power supply wiring and the signal pad have the same bonding width as each other.

6. The antenna structure according to claim 5, further comprising a conductive relay structure disposed between the power supply wiring and the signal pad,
   wherein the conductive relay structure has the same bonding width as that of the power supply wiring and the signal pad.

7. The antenna structure according to claim 1, wherein the flexible circuit board further comprises a core layer and a power supply ground disposed on the upper surface of the core layer, wherein the power supply wiring is disposed on a lower surface of the core layer.

8. The antenna structure according to claim 7, wherein the antenna electrode layer comprises a radiation pattern, a signal pad electrically connected to the radiation pattern, and ground pads disposed around the signal pad, and the power supply ground is electrically connected with the ground pads.

9. The antenna structure according to claim 1, wherein the flexible circuit board is disposed on the antenna electrode layer of the film antenna.

10. The antenna structure according to claim 1, wherein the flexible circuit board is disposed below a lower surface of the dielectric layer of the film antenna.

11. The antenna structure according to claim 10, wherein the film antenna further comprises an antenna ground layer disposed on the lower surface of the dielectric layer.

12. The antenna structure according to claim 10, wherein the antenna electrode layer is bent and extends on the lower surface of the dielectric layer.

13. The antenna structure according to claim 12, wherein the flexible circuit board further comprises a power supply contact which electrically connects the antenna electrode layer and the power supply wiring.

14. The antenna structure according to claim 1, further comprising a circuit structure disposed on the flexible circuit board to supply power to the antenna electrode layer through the power supply wiring.

15. The antenna structure according to claim 14, wherein the antenna structure is driven at a frequency of 20 to 30 GHz, and is supplied with power corresponding to a range of 40 to 70Ω through the circuit structure.

16. The antenna structure according to claim 1, wherein the antenna electrode layer comprises a mesh structure.

17. The antenna structure according to claim 16, wherein the film antenna further comprises a dummy mesh layer disposed around the antenna electrode layer.

18. A display device comprising the antenna structure according to claim 1.

* * * * *